United States Patent
Lee et al.

(10) Patent No.: US 10,320,650 B2
(45) Date of Patent: Jun. 11, 2019

(54) TESTING A NETWORK USING A COMMUNICATION DEVICE

(71) Applicant: JDS Uniphase Corporation, Milpitas, CA (US)

(72) Inventors: Gregory Lee, Blacksburg, VA (US); Jonathan Dunbar, Midlothian (GB); Stuart Macfarlane, Dunfermline (GB)

(73) Assignee: VIAVI SOLUTIONS INC., Milpitas, CA (US)

( * ) Notice: Subject to any disclaimer, the term of this patent is extended or adjusted under 35 U.S.C. 154(b) by 701 days.

(21) Appl. No.: 14/485,006

(22) Filed: Sep. 12, 2014

(65) Prior Publication Data

US 2015/0081758 A1 Mar. 19, 2015

Related U.S. Application Data

(60) Provisional application No. 61/877,518, filed on Sep. 13, 2013.

(51) Int. Cl.
| | | |
|---|---|---|
| *G06F 15/16* | (2006.01) | |
| *H04L 12/26* | (2006.01) | |
| *H04L 29/08* | (2006.01) | |
| *H04W 24/06* | (2009.01) | |

(52) U.S. Cl.
CPC .............. *H04L 43/50* (2013.01); *H04L 67/08* (2013.01); *H04W 24/06* (2013.01)

(58) Field of Classification Search
CPC ......... H04L 43/50; H04L 67/08; H04W 24/06
USPC .................... 709/201, 202, 203, 217, 229
See application file for complete search history.

(56) References Cited

U.S. PATENT DOCUMENTS

| | | | |
|---|---|---|---|
| 7,917,147 B2 | 3/2011 | Bond | 455/446 |
| 8,737,571 B1* | 5/2014 | Seeley | H04M 3/2236 379/1.03 |
| 2002/0127993 A1 | 9/2002 | Zappala | 455/404.2 |
| 2002/0177448 A1 | 11/2002 | Moran et al. | 455/456.1 |
| 2005/0130675 A1 | 6/2005 | Burch et al. | 455/456.5 |
| 2005/0249157 A1* | 11/2005 | Qian | H04L 43/0829 370/329 |
| 2006/0174162 A1* | 8/2006 | Varadarajan | G06F 11/263 714/38.14 |
| 2007/0203973 A1* | 8/2007 | Landauer | H04L 12/2697 709/203 |
| 2008/0270104 A1* | 10/2008 | Stratton | G06F 21/577 703/23 |
| 2009/0190726 A1* | 7/2009 | Yahyaoui | H04M 3/323 379/15.01 |
| 2013/0067019 A1* | 3/2013 | Srinivas | G06F 9/544 709/213 |
| 2013/0080634 A1* | 3/2013 | Grelewicz | H04W 24/06 709/224 |
| 2014/0067915 A1* | 3/2014 | Choi | H04L 67/06 709/203 |

(Continued)

*Primary Examiner* — Liang Che A Wang
*Assistant Examiner* — Kaylee J Huang
(74) *Attorney, Agent, or Firm* — Mannava & Kang, P.C.

(57) ABSTRACT

A network testing system includes a test station and a communication device running an application. A VNC client and a VNC server are provided on the communication device to control the application for network testing purposes. In operation, the test station communicates with the remote VNC client, providing information and context data for the network test. More than one communication device may be used in the test.

15 Claims, 5 Drawing Sheets

(56) References Cited

U.S. PATENT DOCUMENTS

2014/0357250 A1* 12/2014 Nitsan .................. H04W 24/06
                                                                               455/418

\* cited by examiner

TESTING A NETWORK USING A COMMUNICATION DEVICE

CROSS-REFERENCE TO RELATED APPLICATIONS

The present invention claims priority from U.S. Provisional Patent Application No. 61/877,518 filed Sep. 13, 2013, which is incorporated herein by reference.

TECHNICAL FIELD

The present invention relates to communication networks, and in particular to devices and methods for network testing.

BACKGROUND

Communications systems vary in performance depending on time and geographical location. To maintain service quality, communications providers perform network testing on an ongoing basis. Network tests can also be used to verify network installation and upgrades.

One traditional method of network testing is termed "drive testing". A vehicle carrying testing equipment is driven through areas of a wireless communication service, and various parameters e.g. radio frequency (RF) signal strength, signal quality, etc., are continuously tested as the vehicle is driven across the coverage areas. The testing equipment carried around in the vehicle may include a cellular phone controlled by a computer to make and receive test calls, etc.

Due to cost and efficiency issues, the drive testing has been increasingly replaced by more sophisticated methods of testing engaging customers' individual communication devices as test probes. A common drawback of such systems is that the measured network parameters may or may not be related to a direct end user experience with the communications network. Nowadays, end users increasingly use cell phones not only for phone communications, but also for application-based data communications e.g. instant messaging. Furthermore, processing power available in today's smartphones enables a variety of applications such as social networking, Internet browsing, mapping, photo and video sharing, etc. Accordingly, a perceived quality of a network service may not necessarily be related to quality of the phone calls as such, but also, and increasingly so, by the perceived quality of these additional services. The additional services are provided by specialized software programs, or "apps", installed on the smartphones.

In one prior art test system, a Virtual Network Computing (VNC) interface has been used to control a remote smartphone for test purposes. The VNC interfaces are typically used to remotely control computer equipment. The VNC interface includes a "VNC server" and a "VNC client". The VNC server is disposed on the computer to be remotely controlled. The function of the VNC server is to emulate the user input e.g. key presses, mouse moves, and so on. The VNC server also functions as a screen grabber, sending computer's screen images back to the remote user. The VNC client is disposed at the user location. The function of the VNC client is to receive the user input and communicate the user input to the remotely disposed VNC server for simulation of the user input on the remote computer. It may also re-display the grabbed images to the user. In this way, a work computer can be reached and operated from home, and vice versa.

Referring to FIG. 1, such a test system 100 may include a remote management module 102 and a smartphone 104. The smartphone 104 has installed thereon a "target application" 106 and a VNC server 108. The remote management module 102 includes a VNC client 110 and a memory store 112. The remote management module 102 is configured to perform at least one automated operation of the target application 106 by sending a command 103 for the VNC server 108 to emulate a user action. One or more images of a target application graphical user interface are captured by the VNC server 108 and communicated via a VNC data link 109 to the VNC client 110. The images are analyzed by the VNC client 110 at the remote management module 102 to obtain performance data of the target application 106. The obtained performance data are stored in the memory store 112.

One drawback of the test system 100 is that the VNC data link 109 may consume a considerable portion of available data transfer bandwidth of a cellular network being tested. Transmitting the captured smartphone screenshots may cause a considerable network load, both for the cellular network being tested, and for the smartphone 104 participating in the test. Another drawback is that the management module 102 may be overwhelmed with image processing analysis tasks of the screen captures from multiple individual smartphones 104. These drawbacks effectively limit the number of smartphones that can participate simultaneously in the process of cellular network testing.

SUMMARY

In accordance with one embodiment, a VNC client is installed not on a remote test station but on a same communication device where the VNC server is installed. The communication between the remote test station and the VNC client may include compact scripts instead of screen captures and voice messages. As a result, the communication device e.g. a smartphone, becomes a self-contained, "smart" test unit. This allows the data bandwidth requirements of the data exchange between the communication device and the remote test station to be reduced. Furthermore, tasks of image processing may be offloaded from the processor of the remote test station to the processor of the communication device. The VNC interface provides interoperability with a broad variety of applications run on the communication device, e.g. smartphone "apps".

In accordance with another embodiment, there is provided a test system for testing a network, the test system comprising a first communication device and a test station configured to perform a first test by sending a first command to the first communication device via the network to cause the first communication device to transmit or receive first data through the network; wherein the first communication device comprises:

an application controller configured to receive the first command from the test station, the application controller comprising a VNC client configured to generate user input data based on the first command;

a VNC server operationally coupled to the VNC client, configured to generate application input based on the user input data received by the VNC client; and an application operationally coupled to the VNC server, configured cause the first communication device to transmit or receive the first data through the network based on the application input generated by the VNC server;

wherein the VNC server is configured to receive a response of the application upon transmitting or receiving the first data by the first communication device, and to generate application output data therefrom;

wherein the application controller is configured to process the application output data to obtain a result of the first test.

In one exemplary embodiment, the application controller is configured to send the result back to the test station via the network.

In accordance with another embodiment, there is further provided a communication device for use in a network test system comprising a test station configured to perform a first test by sending a first command to the first communication device via the network to cause the first communication device to transmit or receive first data through the network; the communication device comprising:

an application controller configured to receive the first command from the test station, the application controller comprising a VNC client configured to generate user input data based on the first command;

a VNC server operationally coupled to the VNC client, configured to generate application input based on the user input data received by the VNC client; and an application operationally coupled to the VNC server, configured to cause the first communication device to transmit or receive the first data through the network based on the application input generated by the VNC server;

wherein the VNC server is configured to receive a response of the application upon transmitting or receiving the first data by the first communication device, and to generate application output data therefrom; and wherein the application controller is configured to process the application output data to obtain a result of the first test.

In accordance with another embodiment, there is further provided a method for testing a network, the method comprising:

(a) providing a first communication device comprising an application controller comprising a VNC client, a VNC server operationally coupled to the VNC client, and an application operationally coupled to the VNC server;

(b) initiating a first test by sending a first command from a remote test station to the application controller, causing the VNC client to generate user input data based on the first command;

(c) causing the VNC server to generate application input based on the user input data received by the VNC client;

(d) causing the application to transmit or receive the first data through the network based on the application input generated by the VNC server;

(e) causing the VNC server to receive a response of the application upon transmitting or receiving the first data by the first communication device, and to generate application output data therefrom; and (f) causing the VNC client to process the application output data, and causing the application controller to obtain a result of the first test.

In one embodiment, the method comprises communicating the first test result to the test station. By way of a non-limiting example, the result of the first test may include GPS information, signal strength, connection time, quality of audio signal, and service availability.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
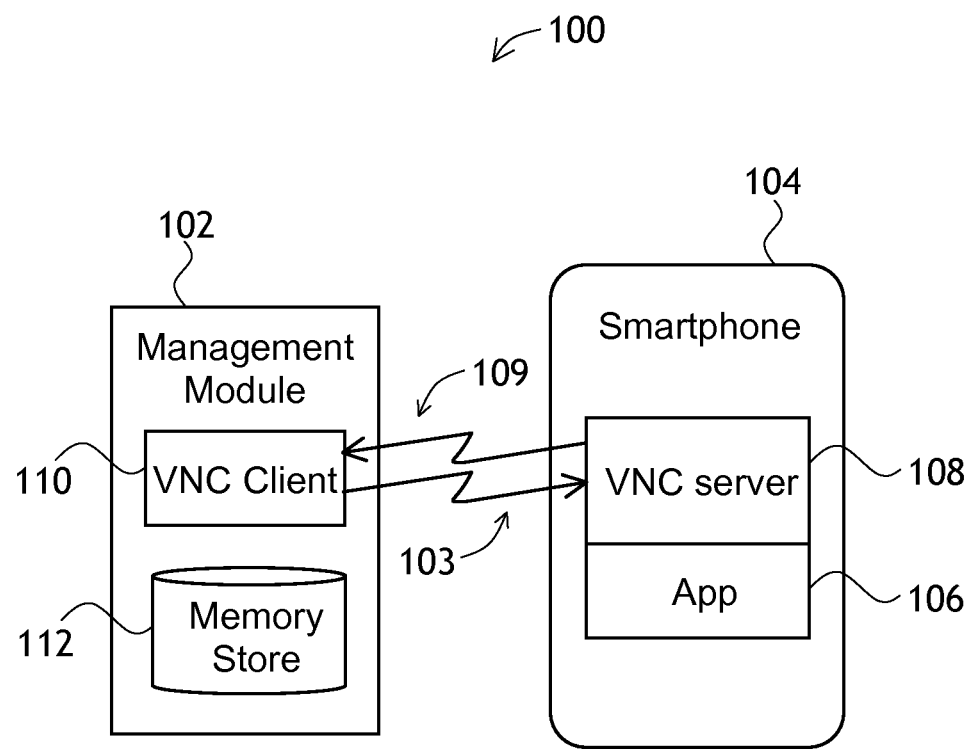
FIG. 1 illustrates a prior-art cellular network test system using a VNC interface for communicating test data.
Figure 2:
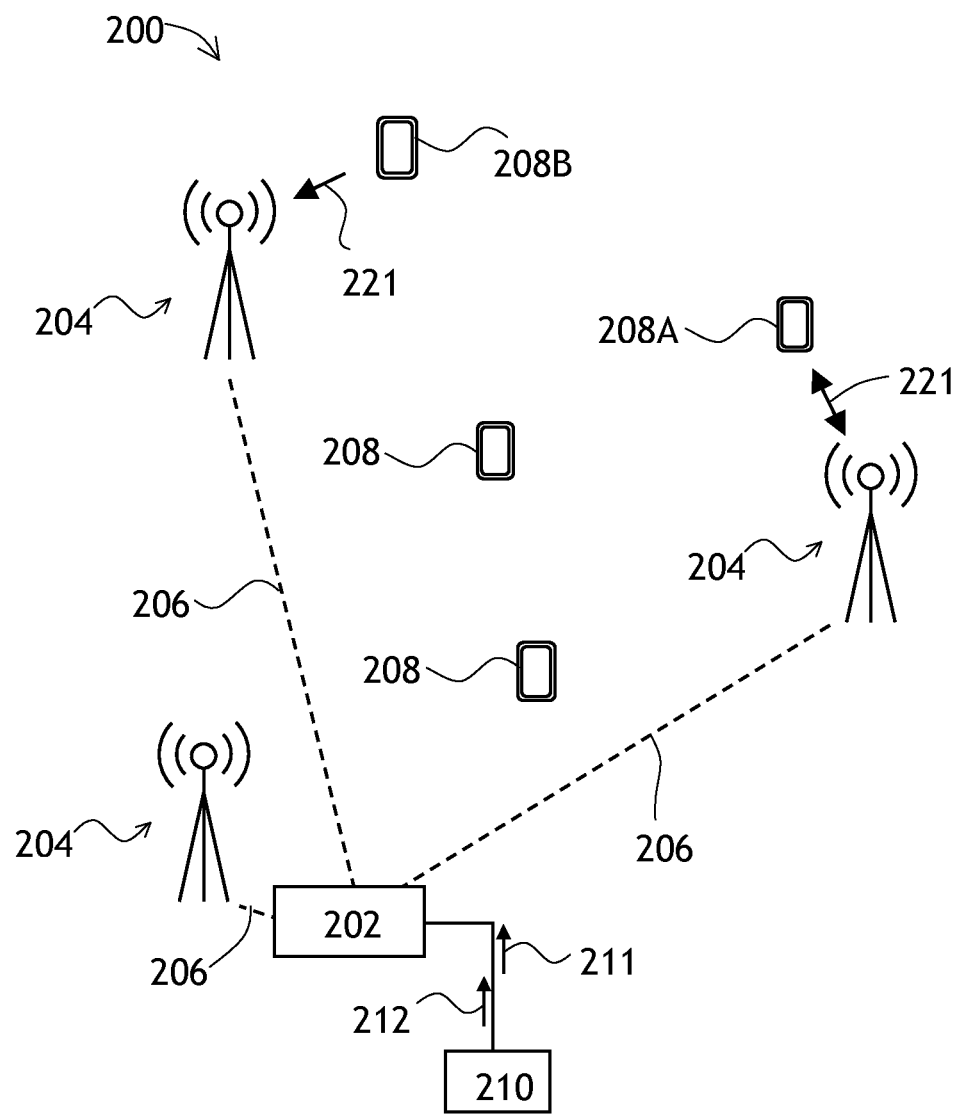
FIG. 2 illustrates a network and a test system according to one embodiment.

Referring to FIG. 2, a cellular network 200 may include a base station 202, a plurality of RF towers 204 connected to the base station 202 via data links 206, and a plurality of wireless communication devices 208, 208A, 208B including a first communication device 208A and a second communication device 208B. According to some embodiments, a test station 210 may be coupled to the base station 202. The test station 210 may also be disposed remotely from the base station 202. The test station 210 may be configured to perform a first test by sending a first command 211 to the first wireless communication device 208A via the cellular network 200 to cause the first wireless communication device 208A to transmit or receive first data 221 through the cellular network 200. Networks other than the cellular network 200 may be tested as well. For example, a service running on a device connected via Wi-Fi or Ethernet on a fixed-line network may be tested. These and other communication networks may be tested using non-wireless, that is, cable-connected communication devices.

Figure 3:
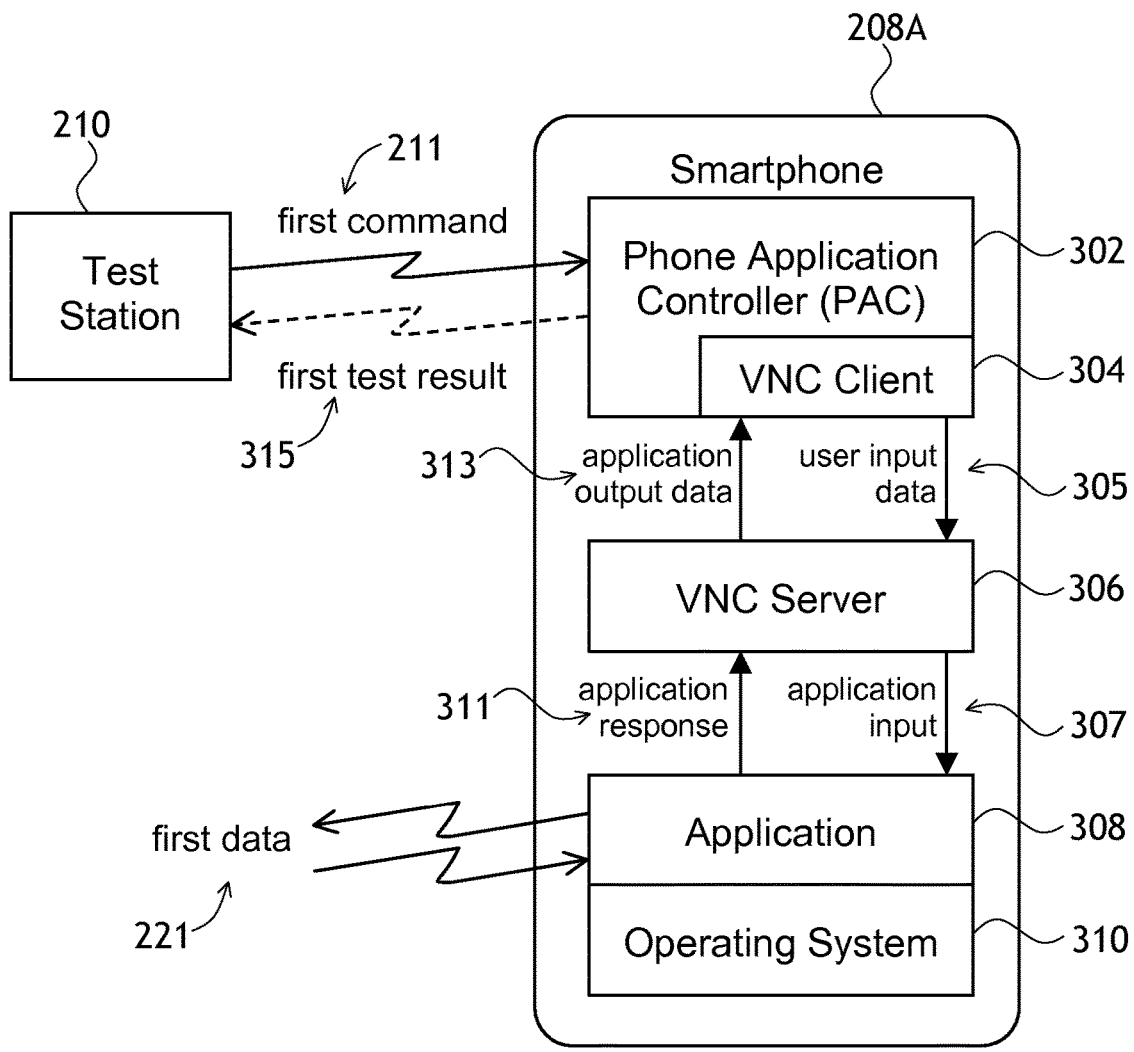
FIG. 3 illustrates a block diagram of the test system of FIG. 2.

Referring to FIG. 3, the first wireless communication device 208A is shown in detail. In the embodiment shown, the first wireless communication device 208A may include an application controller 302 including a VNC client 304, a VNC server 306 operationally coupled to the VNC client 304, an application ("app") 308, e.g. Facebook™, Twitter™, Netflix™, Family Map™, Skype™, etc., is operationally coupled to the VNC server 306, and a mobile operating system 310, e.g. iOS™. The application controller 302 may be configured to receive the first command 211 from the test station 210. The VNC client 304 may be configured to generate user input data 305, e.g. buttons to be pressed, test voice messages or pointers to pre-recorded test voice messages, etc., based on the first command 211. The VNC server 306 may be configured to generate application input 307, that is, emulate pressing the buttons and playback of the test messages, etc., based on the user input data 305 received by the VNC client 304. The application 308 may be configured to cause the first wireless communication device 208A to transmit or receive the first data 221 through the cellular network 200 based on the application input 307 generated by the VNC server 306. Thus, the test of the cellular network 200 may be initiated.

To evaluate a result 315 of sending or receiving the first data 221, the VNC server 306 may be configured to receive a response 311 of the application 308, for example, an output screen, a response voice or text message, etc., upon transmitting or receiving the first data 221 by the first wireless communication device 208A. The VNC server 306 may be configured to generate application output data 313 from the application response 311, for example a screen capture (screenshot), a text representation of the message, etc. The VNC client 304 and/or the application controller 302 may be configured to process the application output data 313, enabling the application controller 302 to obtain the result 315 of the first test. The test result 315 may be communicated back to the test station 210 which has sent the first command 211, or processed internally, e.g. to obtain response statistics. The test result 315 may include GPS information, signal strength, connection time, quality of audio signal, service availability, and the like. As noted above, the first communication device 208A may be a wireless device or it may be connected to a terminal device of the network 200 via a cable.

The first wireless communication device 208A may include a visual display, not shown. The application output data 313 may include a screenshot of the visual display. In this embodiment, the VNC client 304 may be configured to automatically determine a configuration of graphical items of the screenshot. The result of the first test may be evaluated by the application controller 302 from the configuration of the graphical items determined by the VNC client 304. By way of another non-limiting example, the application output data 313 may include an audio signal, i.e. a voice signal, obtained from the received first data 221. For this case, the result of the first test may include a quality parameter of the obtained audio signal. The application controller 302 may be configured to obtain a reception quality parameter based on the first data 221 received, and to send the reception quality parameter to the test station 210 via the cellular network 200.

In one embodiment, the test station 210 may be configured to build a schedule to perform a series of tests of the cellular network 200 including the first test describe above. The first command 211 may include the schedule to be followed. The application controller 302 may be configured to receive the schedule and to perform the series of tests of the cellular network 200 based on the received schedule.

The tests may involve more than one wireless communication device 208. Referring back to FIG. 2, the test station 210 may be configured to send a second command 212 to the second wireless communication device 208B via the cellular network 200 to cause the second wireless communication device 208B to transmit the first data 221 through the cellular network 200 to the first wireless communication device 208A. The second wireless communication device 208B may be configured to transmit the first data 221 through the cellular network 200 to the first wireless communication device 208A upon receiving the second command 212 from the test station 210. The wireless communication devices may include the test software portion, including the application controller 302, the VNC client 304, the VNC server 306, pre-installed before distributing to end customers.

Figure 4:
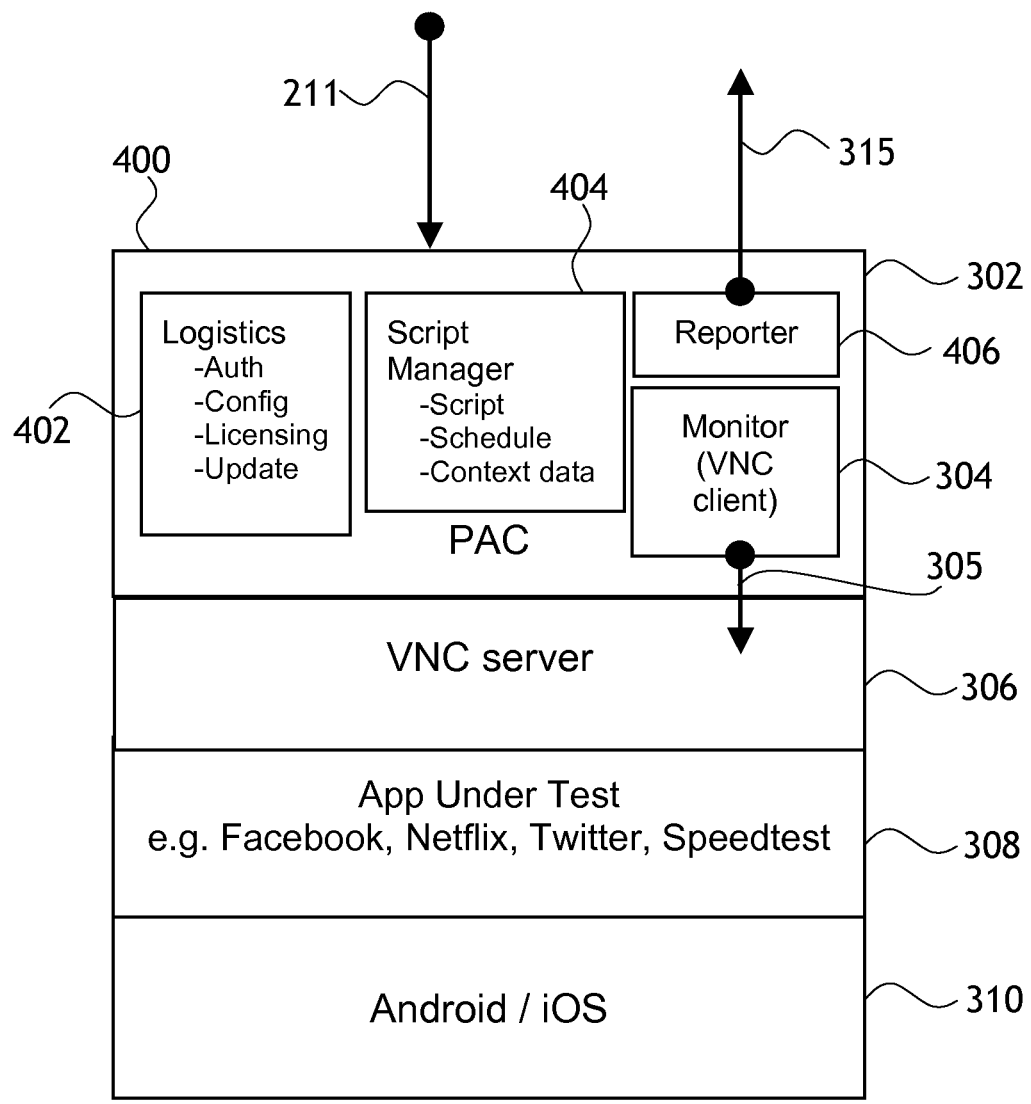
FIG. 4 illustrates a block diagram of an exemplary embodiment of the test system of FIG. 3.

Turning to FIG. 4 with further reference to FIG. 3, a wireless communication device 400 is similar to the first wireless communication device 208A. One feature of the wireless communication device 400 is a specific implementation of the phone application controller (PAC) 302. The PAC 402 may include a logistics module 402, a script manager module 404, and a reporter module 406. The first command 211 may include instructions for the logistics module 402 to authorize remote access to the wireless communication device 400, to configure the wireless communication device 400, to provide licensing information, to provide software updates for the wireless communication device 400, and the like. The script manager module 404 may receive schedules to perform various tests, as well as context data for these tests, e.g. indices to pre-recorded voice messages, phone numbers to call, etc. All this information may be included into the first command 211. The reporter module 406 may analyze results of tests and condense the results into brief scripted reports, to save the bandwidth for transmission of the first test result 315, as well as the processing power requirements for the test station 210. Effectively, the test results may be pre-processed by the wireless communication device 400, and/or the first 208A and/or the second 208B wireless communication devices. This may allow the test station 210 to save its own processing power for involving a larger number of the wireless communication devices 208 into tests of the cellular network 200.

Figure 5:
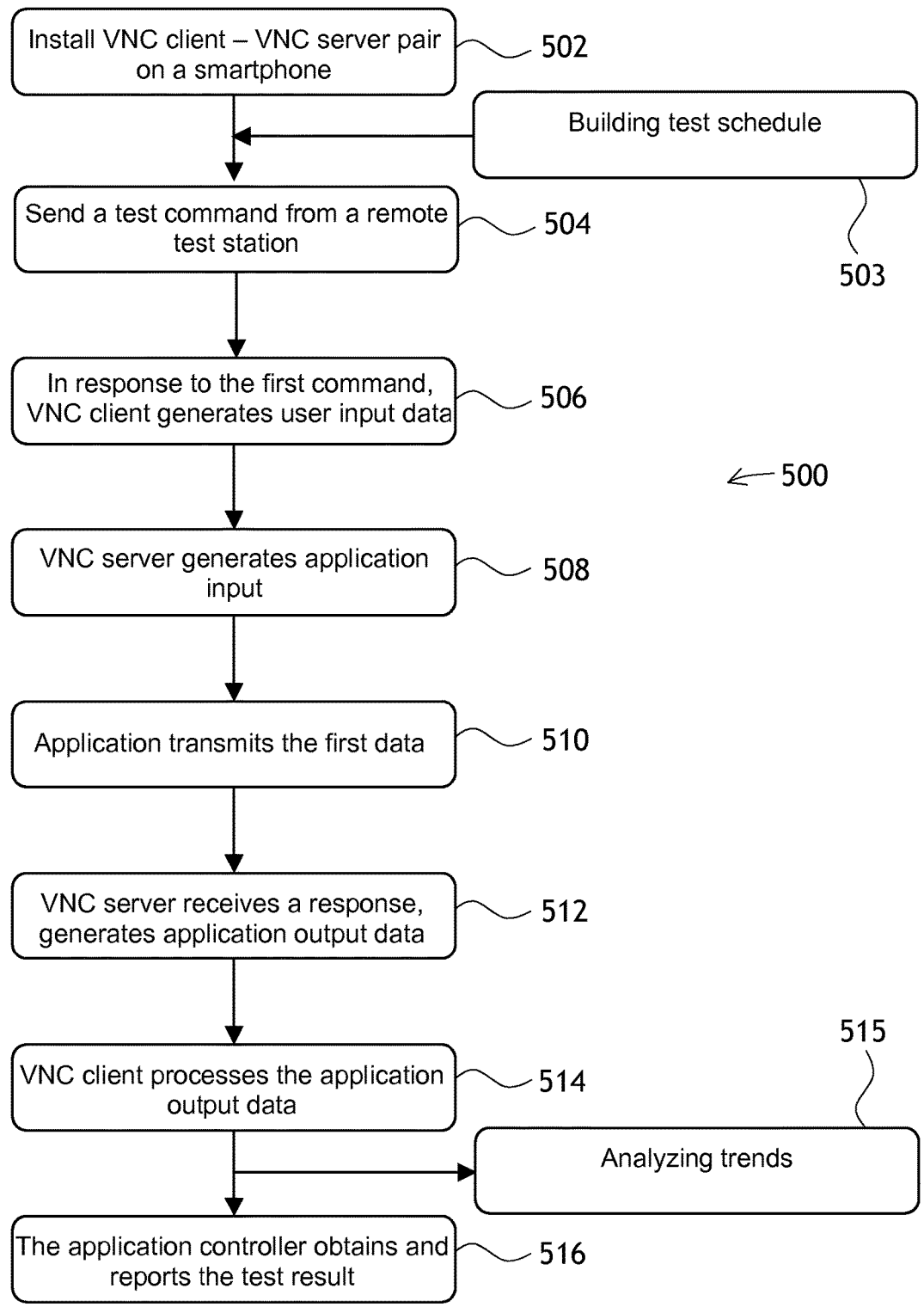
FIG. 5 illustrates a flow chart of a method for testing the cellular network of FIG. 2 using the test system of FIG. 3 or FIG. 4.

Referring now to FIG. 5 with further reference to FIGS. 2 and 3, an exemplary method 500 e.g. for testing the cellular network 200 of FIG. 2 using the test system 300 of FIG. 3, includes a step 502 of providing the first wireless communication device 208A, e.g. a smartphone, having installed thereon the application controller 302 including the VNC client 304, the VNC server 306 operationally coupled to the VNC client 304, and the application 308 operationally coupled to the VNC server 306, as explained above. The VNC client 304 and the VNC server 306 may be software applications installed on the first wireless communication device 208A.

In a step 504, the first test may be initiated by sending the first command 211 (FIG. 3) from the remote test station 210 to the application controller 302, causing the VNC client 304 to generate the user input data 305 in a step 506 (FIG. 5). The user input data 305 may be based on the first command 211. In a next step 508, the VNC server may generate the application input 307, e.g. key presses and voice messages, based on the user input data 305 received by the VNC client 304. In a next step 510, the application 308 transmits or receives the first data 221 through the cellular network 200. The first data 221 may be based on the application input 307 generated by the VNC server 306. For example, the application 308 may receive the first data 221 from the second wireless communication device 208B, which has sent the first data 221 upon receiving the corresponding second command 212 (FIG. 2) from the test station 210, as explained above. The first data 221 may include instant messages, voice messages, text, a Web page, an image, and so on.

In a following step 512 of the method 500 (FIG. 5), the VNC server 306 may receive the application response 311 (FIG. 3) upon transmitting or receiving the first data 221 by the first wireless communication device 208A, and may generate the application output data 313 from the application response 311. In a next step 514, the VNC client 304 may process the application output data 313, and the application controller 302 may obtain the first test result 315 from the processed application output data 313. For example, such results as quality of a phone call or a data connection, connection time, service availability, ping time, and the like may be obtained using known digital data processing methods. Finally, in an optional step 516, the application controller 302 may report the first test result 315 to the test station 210. The first command 322 and the first test result 315 may also be communicated via a wired communications link. Accordingly, the network being tested using the method 500 may generally include a non-wireless communications network, for instance a cable network, an optical network, and so on.

The method 500 allows one to obtain quality of service as used by end customers. The method 500 may be used to test end user service availability, service coverage, service performance, service conformance to specifications and agreements, service quality, service capacity, and the like. Phone-to-phone voice and SMS instant message tests, or phone to server tests may be performed. Standardized measurements as recommended by TS 102 250, IREG, GRQ and TADIG standards, may be performed. Furthermore, the test method 500 may also be used for lower-level tests such as RF coverage and network protocol tracing. Widely distributed measurement capacity and centralized control of which ones of the wireless communication device 208 participate in taking measurements enables the testing to be more systemic. A centralized data analysis platform with geo-mapping capability may be used to aggregate multiple measurements and study the results for optimization of radio access network (RAN) coverage.

In one embodiment, the application output data 313 may comprise a screenshot of the display of the first wireless communication device 208A. The VNC client 304 may automatically determine a configuration of graphical items of the screenshot to determine the first test result 315 in the processing step 514, based on possible graphical output of the application 308, e.g. a button highlighted, a button not highlighted, an alarm message put on screen, etc., in accordance with a graphical user interface used by the application 308. The application output data 313 may also include an audio signal obtained from the received first data 221. For this embodiment, the processing step 514 may include evaluating a parameter of the audio signal, e.g. audio quality, jitter, echo, etc. The processing step 514 may be performed by the application controller 302 (FIG. 3).

In an embodiment of the method 500 that involves two wireless communications devices 208A and 208B, the second command 212 is sent from the remote test station 210 to the second wireless communication device 208B via the cellular network 200, causing the second wireless communication device 208B to transmit the first data 221 through the cellular network 200 to the first wireless communication device 208A.

To streamline ongoing testing of the cellular network 200, the method 500 may include a step 503 of building a schedule to for the first wireless communication device 208A to perform a series of tests of the cellular network, not just one first test. When the schedule is created, it may be sent from the remote test station 210 to the first wireless communication device 208A in the step 504. When the schedule is received by the application controller 302 of the first wireless communication device 208A, the application controller 302 may control the first wireless communication device 208A to perform at least one of the series of tests in steps 506 to 514. The test results may be analyzed in a step 515.

The testing steps 504 to 514 of the method 500 may be periodically repeated to validate long-term performance of the cellular network 200. When the testing steps 504 to 514 are repeated over a period of time, the processing step 514 of the method 500 may include analyzing a time dependence of the first test result 315. The validation schedule may be generated and implemented on the remote test station 210, or alternatively, when the validation schedule is received by the application controller 302, the latter may initiate the periodic testing and accumulate/analyze test results locally, to save the bandwidth of the cellular network 200 and the processing power of the remote test station 210.

The method 500 of FIG. 5 may also be used for network update verification purposes. To that end, the testing steps 504 to 514 may be performed twice, before and after an upgrade of the cellular network 200 (FIG. 2), and the quality parameter obtained in the steps 514 performed before and after the upgrade are compared to each other.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments has been presented for the purposes of illustration and description. It is not intended to be exhaustive or to limit the precise form disclosed. Many modifications and variations are possible in light of the above teaching.

What is claimed is:

1. A test system communication device comprising:
   a processor; and
   a memory on which is stored machine readable instructions that when executed by the processor cause the processor to:
   receive, at an application controller executed by the processor, a first command from a remote test station, the first command including a schedule to perform tests on an application and including context data for the tests, and wherein the application controller performs the tests on the application in accordance with the schedule, wherein to perform each of the tests:
   the application controller is to cause a virtual network computing (VNC) client executed by the processor to generate user input data based on the context data;
   a VNC server, executed by the processor, is to receive the user input data from the VNC client, and is to generate and provide application input data to the application based on the user input data;
   the application, executed by the processor, is to cause first data to be received through a network based on the application input data,
   wherein the first data is received from a second communication device, and wherein the second communication device is to receive a second test command from the remote test station to cause the second communication device to transmit the first data through the network to the test system communication device;
   the VNC server is to receive a response from the application upon transmitting or receiving the first data, and is to generate application output data; and
   the application controller is to process the application output data to obtain a test result, wherein the application controller is to accumulate the test results for the tests performed in accordance with the schedule, condense the test results into brief scripted reports, and transmit the brief scripted reports to the remote test station via the network.

2. The test system communication device of claim 1, comprising:
a display, wherein the application output data comprises a screenshot of the display, wherein the VNC client is configured to automatically determine a configuration of graphical items of the screenshot, wherein the test result is determined based on the configuration of the graphical items determined by the VNC client.

3. The test system communication device of claim 1, wherein the application output data comprises an audio signal obtained from the received first data, wherein the test result comprises a quality parameter of the audio signal.

4. The test system communication device of claim 1, wherein the network comprises a wireless network.

5. The test system communication device of claim 1, wherein the processor is to receive a second command from the test station via the network, wherein the second command is to cause transmission of the first data to a first communication device.

6. A network test communication device comprising:
a processor;
an application controller executable by the processor;
a memory on which is stored machine readable instructions executable by the processor to:
receive at the application controller a command from a remote test station via a network, wherein the command includes a schedule to perform tests on an application and includes context data for the tests, and wherein the application controller performs the tests on the application in accordance with the schedule, wherein to perform each of the tests;
the application controller is to cause a virtual network computing (VNC) client executed by the processor to generate user input data based on the context data;
generate, by a VNC server executed by the processor, application input based on the user input data provided by the VNC client;
receive first data, by the network test communication device, through the network based on the application input generated by the VNC server, wherein the first data is received from a second communication device, and wherein the second communication device is to receive a second test command from the remote test station to cause the second communication device to transmit the first data through the network to the network test communication device;
the VNC server is to receive a response from the application upon transmitting or receiving the first data, and to generate application output data; and
the application controller is to process the application output data to obtain a test result, wherein
the application controller is to accumulate the test results for the tests performed in accordance with the schedule, condense the test results into brief scripted reports, and transmit the brief scripted reports to the remote test station via the network.

7. The network test communication device of claim 6 further comprising a display, wherein the application output data comprises a screenshot of the display, wherein the VNC client is configured to automatically determine a configuration of graphical items of the screenshot, wherein the application controller is to determine the test result based on the configuration of the graphical items.

8. The network test communication device of claim 6, wherein the application output data comprises an audio signal obtained from the received first data, and wherein the test result comprises a quality parameter of the audio signal.

9. The network test communication device of claim 6, configured for wireless communication with the test station.

10. A testing method comprising:
launching an application controller on a communication device, wherein the application controller comprises a virtual network computing (VNC) client, executed on the communication device, connected to a virtual network computing (VNC) server, executed on the communication device;
receiving a test command from a remote test station at the application controller, wherein the test command includes a schedule to perform tests on an application executed on the communication device and includes context data for the tests;
performing the tests on the application executed on the communication device in accordance with the schedule, wherein to perform each of the tests comprises:
generating, by the VNC client, user input data based on the context data;
generating, by the VNC server, an application input based on the user input data provided by the VNC client;
receiving first data through a network based on the application input generated by the VNC server,
wherein receiving the first data includes receiving the first data at the communication device from a second communication device, and wherein the second communication device is to receive a second test command from the remote test station to cause the second communication device to transmit the first data through the network to the communication device;
receiving, by the VNC server, a response from the application upon transmitting or receiving the first data by the communication device, and generating application output data; and
processing, by the VNC client, the application output data, and causing the application controller to obtain a test result;
accumulating, by the application controller, the test results for the tests performed in accordance with the schedule;
condensing, by the application controller, the test results into brief scripted reports; and
transmitting, by the application controller, the brief scripted reports to the remote test station via the network.

11. The method of claim 10, wherein the communication device comprises a display, wherein the application output data comprises a screenshot of the display, and the method comprises:
determining, by the VNC client, a configuration of graphical items of the screenshot, wherein the test result is determined by the application controller based on the configuration of the graphical items.

12. The method of claim 10, wherein the application output data comprises an audio signal obtained from the first data,
wherein, the test result comprises a quality parameter of the audio signal.

13. The method of claim 10, wherein the test result comprises at least one of: a GPS information, a signal strength, a connection time, an audio signal quality, and a service availability.

14. The method of claim 10, further comprising:
analyzing a time dependence of each test result.

15. The method of claim 10, comprising:
upgrading the network;
repeating the performing the; and
comparing a quality parameter determined before and after the upgrading of the network.

* * * * *